United States Patent
Kern et al.

(10) Patent No.: US 7,540,546 B2
(45) Date of Patent: Jun. 2, 2009

(54) MOBILE EMERGENCY HOSPITAL

(75) Inventors: Julie A. Kern, Sunman, IN (US); Kenneth L. Kramer, Greensburg, IN (US); Richard W. Chance, Greenwood, IN (US); Nathan I. Carver, Batesville, IN (US); Frederic Le Roy, Cincinnati, OH (US); Dennis Paul LaLoge, Batesville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 191 days.

(21) Appl. No.: 11/628,021

(22) PCT Filed: May 31, 2005

(86) PCT No.: PCT/US2005/019084

§ 371 (c)(1),
(2), (4) Date: Nov. 28, 2006

(87) PCT Pub. No.: WO2005/120896

PCT Pub. Date: Dec. 22, 2005

(65) Prior Publication Data

US 2007/0228692 A1 Oct. 4, 2007

Related U.S. Application Data

(60) Provisional application No. 60/576,867, filed on Jun. 3, 2004, provisional application No. 60/576,868, filed on Jun. 3, 2004, provisional application No. 60/607,198, filed on Sep. 3, 2004.

(51) Int. Cl.
*A61G 3/00* (2006.01)
(52) U.S. Cl. .................................. 296/19; 296/193.04
(58) Field of Classification Search ................... 296/19, 296/26.02, 26.03, 26.08, 26.12, 193.03, 193.04
See application file for complete search history.

(56) References Cited

U.S. PATENT DOCUMENTS

| | | | |
|---|---|---|---|
| 3,492,767 A | 2/1970 | Pincus |
| 3,623,284 A | 11/1971 | Meyer |
| 3,742,932 A | 7/1973 | Greenspan |
| 4,181,347 A | 1/1980 | Clark |
| 4,425,978 A | 1/1984 | Star |
| 5,727,353 A | 3/1998 | Getz et al. |
| 5,800,002 A | 9/1998 | Tiedge et al. |
| 6,082,799 A | 7/2000 | Marek |
| 6,209,939 B1 | 4/2001 | Wacker |
| 6,428,073 B1 | 8/2002 | Blodgett, Jr. |
| 6,497,442 B1 | 12/2002 | Wacker |
| 6,712,414 B2 | 3/2004 | Morrow |
| 7,100,967 B2 | 9/2006 | Shea |
| 2004/0160074 A1 | 8/2004 | Shea |

*Primary Examiner*—Lori L Lyjak
(74) *Attorney, Agent, or Firm*—Barnes & Thornburg LLP

(57) ABSTRACT

A mobile emergency hospital comprises a first wheeled trailer and a second wheeled trailer parked alongside the first trailer such that adjacent side walls of the first and second trailers are arranged to confront each other. The first and second trailers have patient care equipment associated with first and second portions of the emergency hospital, respectively. The adjacent side walls of the two trailers have openings which are generally aligned with each other to form one or more passageways through which caregivers pass between the two trailers. The first trailer may include a plurality of wall units arranged along a non-adjacent side wall of the first trailer. Each such wall unit may include a plurality of service connectors and a foldout bed. The trailers may include expandable sections to provide additional floor space.

19 Claims, 13 Drawing Sheets

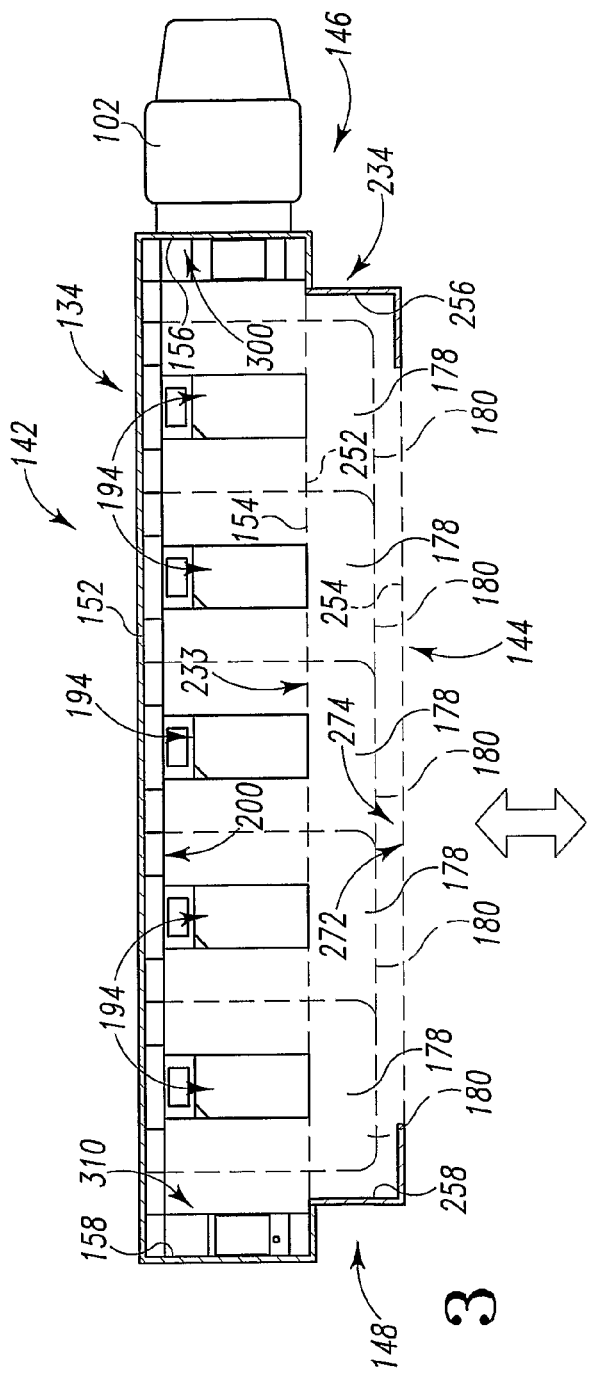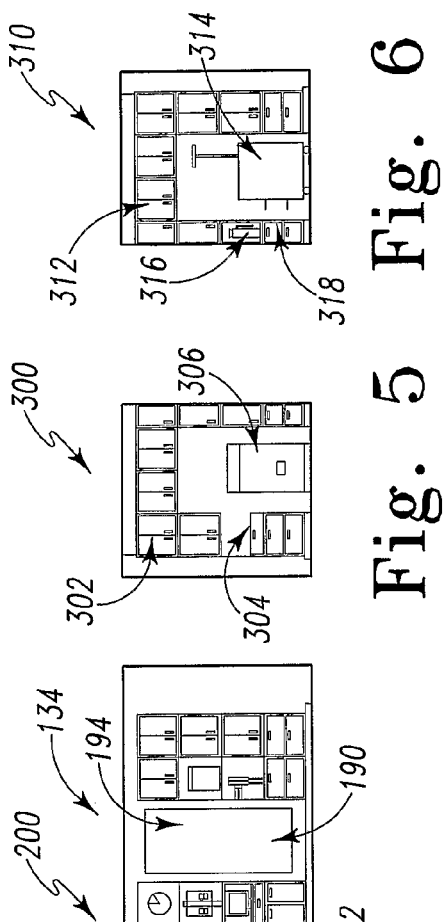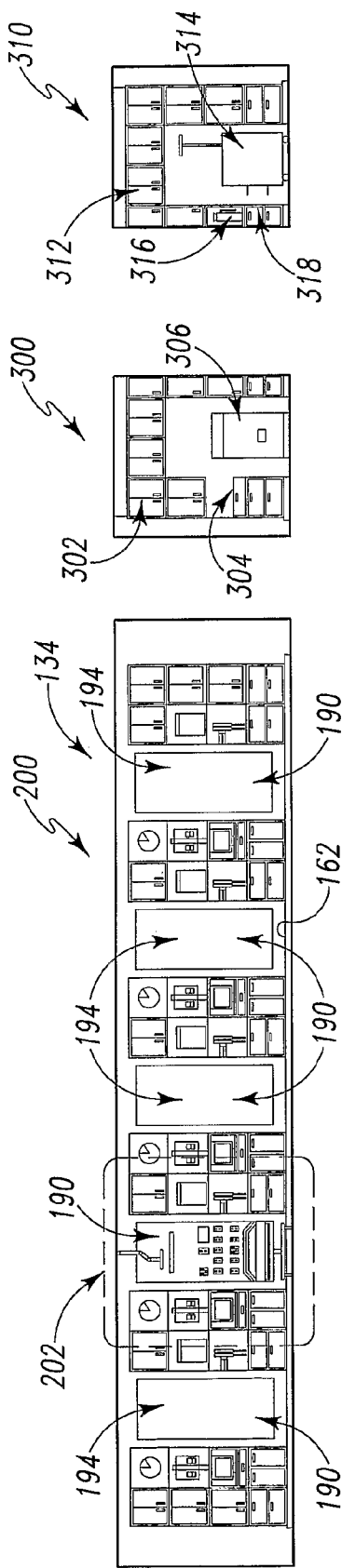

MOBILE EMERGENCY HOSPITAL

CROSS-REFERENCE TO RELATED APPLICATIONS

This application is a U.S. national counterpart application under 37 C.F.R. § 371(b) of PCT international application serial no. PCT/US2005/019084 filed May 31, 2005, which claims the benefit, under 35 U.S.C. § 119(e), of U.S. Provisional Patent Applications Ser. Nos. 60/576,867 filed Jun. 3, 2004; 60/576,868 filed Jun. 3, 2004, and 60/607,198 filed Sep. 3, 2004, all of which are hereby incorporated by reference herein.

BACKGROUND OF THE INVENTION

The present disclosure relates to a mobile emergency hospital, and particularly relates to a mobile emergency hospital housed in trailers, such as those used in tractor/trailer rigs, attached to truck tractors.

It is desirable to quickly set up a mobile emergency hospital at the site of a catastrophe, such as, for example, a hurricane, a flood, an earth quake, and the like, to triage the victims and to provide emergency treatment to stabilize a victim's condition and to minimize potential for further injury during transport to an appropriate service.

SUMMARY OF THE INVENTION

The present invention comprises an apparatus that has one or more of the following features or combinations thereof, which alone or in any combination may comprise patentable subject matter.

A mobile emergency hospital may comprise a first wheeled trailer, and a second wheeled trailer parked alongside the first trailer such that adjacent side walls of the first and second trailers are arranged to confront each other. The first and second trailers may have patient care equipment associated with first and second portions of the emergency hospital. The adjacent side walls of the first and second trailers may have openings which are generally aligned with each other to form one or more passageways through which caregivers pass between the two trailers.

The first trailer may comprise a patient treatment trailer having at least one wall unit including a plurality of service connectors and a foldout patient bed. Illustratively, the foldout bed includes a deck movable between a raised storage position and a lowered use position. Illustratively, the service connectors are concealed behind the deck when the deck is in the storage position.

The at least one wall unit may comprise a plurality of such wall units arranged along a non-adjacent side wall of the patient treatment trailer. Each such wall unit may include a plurality of service connectors and a foldout bed. A non-adjacent side of the first trailer means the side of the first trailer opposite from the side adjacent the second trailer.

The plurality of service connectors may include any one or more of the following: electrical power outlets to supply electrical power, medical gas outlets to supply medical gases (such as, for example, any one or more of oxygen, nitrogen, and air), negative pressure outlets to supply vacuum, and data communication ports to receive and transmit data (such as, for example, any one or more of informational data, audio data and video data).

The patient treatment trailer may include any one or more of the following: a patient examination light, a reading light, a patient monitor, an equipment monitor, a computer, a fold-down shelf, a fold-down seat, an overbed table, a trash bin, a bio-hazard bin, a clock, a view-box, storage cabinets, drawers, a crash cart, an automated medication dispensing station, a fire extinguisher, a hand washing module, and an OTO/ophthalmoscope.

The second trailer may comprise a work space trailer to serve as a triage and control area, and a corridor to provide access to the patient treatment bays. The second trailer may have any one or more of the following: a nurse work station, a work counter, a fold-down shelf, a fold-down seat, a patient toilet, a hand washing unit, a shower, a patient charting station, supply cabinets, drawers, a trash bin, a bio-hazard bin, a fire extinguisher, a stretcher access ramp, doors and a staff access stairway.

The emergency hospital may further comprise a second patient treatment trailer parked alongside the work space trailer on the side of the work space trailer opposite from the first-mentioned patient treatment trailer. Adjacent side walls of the work space trailer and the second patient treatment trailer may have openings which are generally aligned with each other to form one or more passageways through which caregivers pass between the work space trailer and the second patient treatment trailer. The second patient treatment trailer may have a plurality of wall units along a non-adjacent side wall thereof. Each such wall unit of the second patient treatment trailer may comprise a plurality of service connectors and a foldout patient bed.

The emergency hospital may further comprise a utility supply trailer parked adjacent to the patient treatment and work space trailers. The utility supply trailer may includes any one or more of the following: equipment to supply electrical power, equipment to supply medical gases (such as, for example, any one or more of oxygen, nitrogen, and air), equipment to supply vacuum, a hand washing unit and a toilet. In addition, the utility supply trailer may provide facilities for transmitting and receiving audio and video data. Illustratively, a plurality of service lines extend from the equipment located in the utility supply trailer to the associated service connectors in the patient treatment and work space trailers. The service lines may be routed, in part, through any one or more of the following: the ceiling, the floor and the walls of the respective trailers.

The emergency hospital may further comprise a diagnostic lab trailer parked adjacent to the patient treatment and work space trailers. The diagnostic lab trailer may include any one or more of the following: diagnostic equipment, imaging equipment, testing equipment, a hand washing unit, a toilet and storage facilities for stretchers.

Illustratively, each trailer has a pair of end walls and a pair of side walls extending between the end walls to define an interior space to house patient care equipment. At least one of the trailers may include an expandable section to provide additional floor space. The expandable section may comprise a slide-out room. Illustratively, each trailer is approximately 8 feet wide (about 2.44 meters) and 48 feet long (about 14.64 meters), and the slide-out room is approximately 4 feet wide (about 1.22 meters) and 44 feet long (about 13.42 meters).

Also according to this disclosure, a mobile emergency hospital may comprise a first wheeled trailer having patient care equipment associated with a first portion of the emergency hospital. A second wheeled trailer may be parked alongside the first trailer on a first side thereof such that adjacent side walls of the first and second trailers confront each other. A third wheeled trailer may be parked alongside the first trailer on a second side thereof such that adjacent side walls of the first and third trailers confront each other. The second and third trailers may have patient care equipment associated with a second portion of the emergency hospital. The adjacent side walls of the first and second trailers may have openings which are generally aligned with each other to form passageways through which caregivers pass between the first and second trailers The adjacent side walls of the first and third trailers may have openings which are generally aligned with each other to form passageways through which caregivers pass between the first and third trailers.

A mobile emergency hospital may comprise a wheeled trailer having end walls and side walls extending between the end walls to form an interior space to house patient care equipment. At least one of the side walls of the trailer may have an expandable section, such as a slide-out room.

Additional features, which alone or in combination with any other feature(s), such as those listed above and in the appended claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which:

FIG. 3 is a diagrammatic plan view of the left patient treatment trailer of FIG. 2 showing five patient treatment bays on the left side thereof and a slide-out room on the right side thereof;

FIG. 4 is an elevation view from the perspective of a viewer standing inside the left patient treatment trailer of FIG. 3 and looking toward the left side of the left patient treatment trailer showing five wall units each having a foldout bed movable between a closed position and an open position, and further showing one foldout bed moved to an open position;

FIG. 5 is an elevation view from the perspective of a viewer standing inside the left patient treatment trailer of FIG. 3 and looking toward the front of the left patient treatment trailer showing a plurality of supply cabinets, a work counter and an automated medication dispensing station;

FIG. 6 is an elevation view from the perspective of a viewer standing inside the patient treatment trailer of FIG. 3 and looking toward the rear of the patient treatment trailer showing a plurality of supply cabinets, a crash cart, a fire extinguisher cabinet and a plurality of drawers;

DETAILED DESCRIPTION OF THE DRAWINGS

Figure 1:
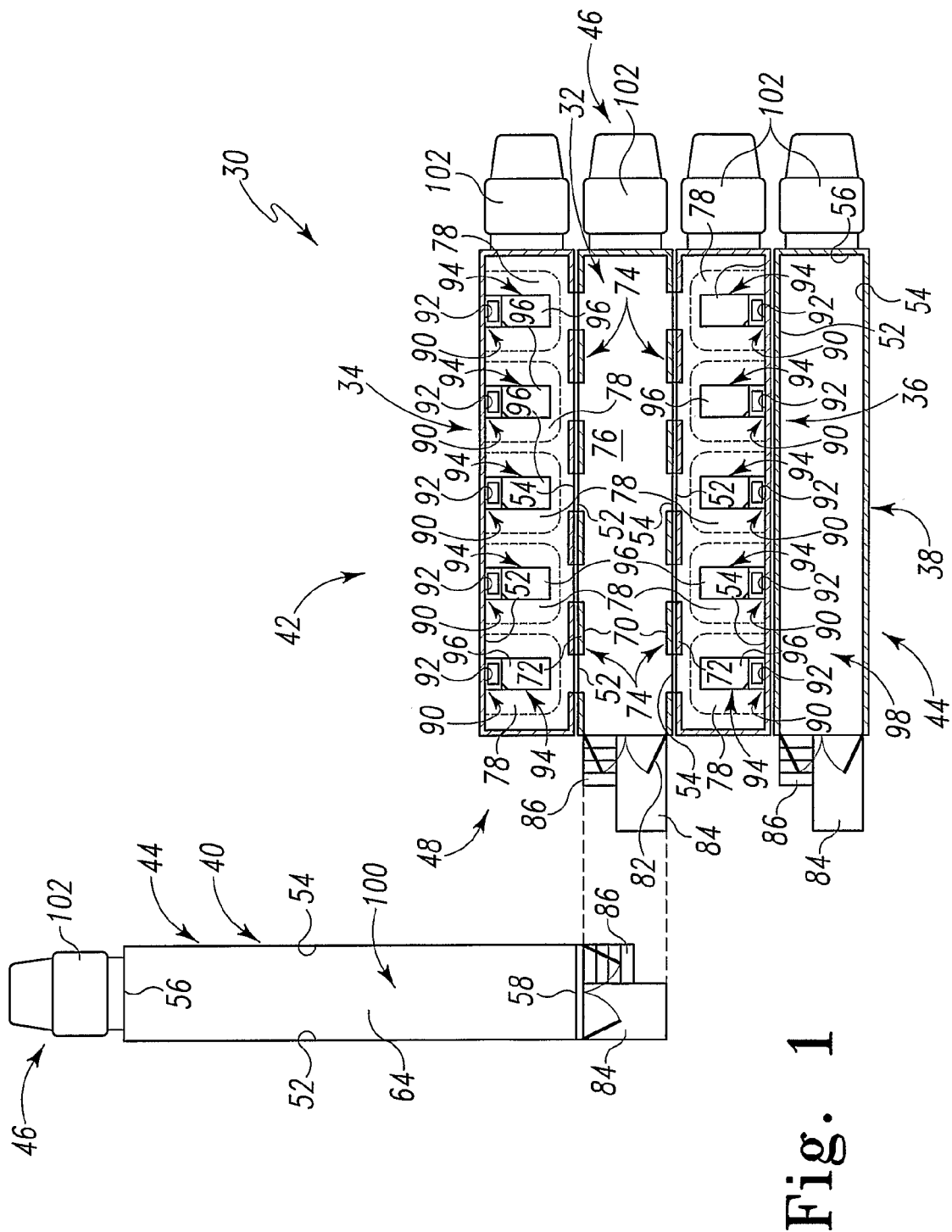
FIG. 1 is a diagrammatic plan view of a first embodiment of a mobile emergency hospital showing a work space trailer, a patient treatment trailer parked on each side of the work space trailer, and utility supply and diagnostic lab trailers parked near the patient treatment and work space trailers, the adjacent side walls of the patient treatment and work space trailers having openings which are generally aligned with each other to form passageways through which caregivers can pass between the respective trailers.

FIG. 1 illustrates a first embodiment 30 of a mobile emergency hospital comprising a first work space trailer 32, a second patient treatment trailer 34 parked on a left side 42 of the work space trailer 32 such that adjacent side walls 52, 54 of the trailers 32, 34 are arranged to confront each other, and a third patient treatment trailer 36 parked on a right side 44 of the work space trailer 32 such that adjacent side walls 54, 52 of the trailers 32, 36 are arranged to confront each other. Adjacent side walls of the trailers 32, 34 and 32, 36 are formed to include passageways 74 through which caregivers pass between the respective trailers 32, 34, 36. The patient treatment trailers 34, 36 on the left and right sides 42, 44 of the work space trailer 32 are referred to herein as the left and right patient treatment trailers 34, 36, respectively. Parked near the work space and patient treatment trailers 32, 34, 36, are a fourth utility supply trailer 38 and a fifth diagnostic lab trailer 40. The utility supply trailer 38 supplies utilities and the diagnostic lab trailer 40 provides lab facilities to the work space and patient treatment trailers 32, 34, 36. The utility supply and diagnostic lab trailers 38, 40 provide the mobile emergency hospital 30 with a measure of self-sufficiency. Doors with retractable stairs and/or ramps descending to the ground are provided at the rear 48 of the trailers 32, 34, 36, 38, 40. The trailers 32, 34, 36, 38, 40 are of the type used in commercial tractor/trailer rigs found on the interstate highways, and conform with the applicable regulations. Alternative embodiments use cargo containers of the type used for overseas shipping. Some embodiments use container-like shells with or without removable wheels. Additional embodiments include trailers used in other countries.

The trailers 32, 34, 36, 38, 40 can be hooked to associated truck tractors 102 and driven to the site of a catastrophe, such as, for example, a hurricane, a flood, a wild fire, an earth quake, and the like, to triage the victims and to provide Initial emergency Management. Initial Emergency Management is care provided to stabilize a victim's condition and to minimize potential for further injury during transport to an appropriate service. In some instances, the patient treatment trailers 34, 36 act as large ambulances to evacuate the victims of a catastrophe. As shown in FIG. 21, the mobile emergency hospital 30 can be placed in a parking lot of a hospital next to an emergency department of the hospital to expand the capacity of the emergency department on a short notice.

From the perspective of a viewer standing at the rear of a trailer and looking toward the front of the trailer, each trailer has a left side 42, a right side 44, a front end 46, and a rear end 48. Likewise, each trailer has a left side wall 52, a right side wall 54, a front end wall 56, a rear end wall 58, a ceiling, and a floor defining an interior space 64 to house patient care equipment associated with an associated portion of the emergency hospital 30. Illustratively, each trailer has the following dimensions: 1) an interior space of the trailer approximately 8 feet wide (about 2.44 meters), 9 feet high (about 2.74 meters) and 48 feet (about 14.64 meters) long, 2) the outside width of the trailer about 8.5 feet (about 2.59 meters), 3) the overall height of the trailer about 13 feet (about 3.96 meters) above the pavement, and 4) the floor height of the trailer about 3 feet (about 0.91 meter) above the pavement.

Referring to FIG. 1, the left side wall 52 of the work space trailer 32 and the right side wall 54 of the left patient treatment trailer 34 have respective openings 70, 72 which are generally aligned with each other to form passageways 74 through which caregivers pass between the respective trailers 32, 34. The right side wall 54 of the work space trailer 32 and the left side wall 52 of the right patient treatment trailer 36 have respective openings 70, 72 which are generally aligned with each other to form passageways 74 through which caregivers pass between the respective trailers 32, 36. During transport, the passageways 74 are closed by doors (not shown), such as overhead doors (like garage doors), or sliding doors, or hinged doors. The work space trailer 32 includes a triage and control area 76. Passageways 74 provide access to patient treatment bays 78 of the patient treatment trailers 34, 36. The work space trailer 32 includes a pair of hinged doors 82, a retractable stretcher access ramp 84 and a retractable staff access stairway 86 at the rear 48 of the work space trailer 32. The access ramp 84 slopes at about 30° to the pavement.

The left side wall 52 of the work space trailer 32 and the right side wall 54 of the left patient treatment trailer 34 are referred to herein as "adjacent" or "confronting" side walls. Likewise, the right side wall 54 of the work space trailer 32 and the left side wall 52 of the right patient treatment trailer 36 are referred to herein as "adjacent" or "confronting" side walls. The adjacent side walls of the trailers 32, 34, 36 may not be coupled together. Alternatively, the adjacent side walls of the trailers 32, 34, 36 may be coupled together by suitable coupling mechanisms. The walls of the trailers 32, 34, 36 are considered adjacent or confronting regardless of whether they abut or are just near each other with a space therebetween. Bridging members (not shown), such as mats, may be utilized in the passageways 74 between the adjacent trailers 32, 34, 36 to compensate for misalignment between the floors of the trailers 32, 34, 36.

The left patient treatment trailer 34 has a plurality of wall units 90 along the left side wall 52. The right patient treatment trailer 36 has a plurality of wall units 90 along the right side wall 54. Each wall unit 90 includes a plurality of service connectors 92 and a foldout patient bed 94. As shown in FIG. 4, each foldout bed 94 includes a deck 96 movable between a raised storage or closed position and a lowered use or open position. A mattress pad (not shown) is releasably attached to the deck 96 by suitable fasteners, such as Velcro tapes. Illustratively, the service connectors 92 are concealed behind the deck 96 when the deck 96 is the storage position. The service connectors 92 include any one or more of the following: electrical power outlets to supply electrical power, medical gas outlets to supply medical gases (such as, for example, any one or more of oxygen, nitrogen, and air), negative pressure outlets to supply vacuum, and data communication ports to receive and transmit data (such as, for example, any one or more of informational data, audio data and video data). PCT Publication No. WO 2005/120294 discloses such a foldout bed module and is hereby incorporated by reference herein.

In some embodiments, privacy curtains (not shown) may be provided around the patient treatment bays 78. The American Institute of Architects ("AIA") Guidelines for Design and Construction of Hospital and Health Care Facilities require 80 square feet (7.43 square meters) of clear floor space per bed for Initial Emergency Management. In the illustrated embodiment, each bay 78 is about 8 feet (2.44 meters) wide and 12 feet (3.6576 meters) long, and provides about 96 square feet (8.92 square meters) of clear floor space per bed 94 which exceeds the AIA Guidelines for Initial Emergency Management.

The utility supply trailer 38 includes an area 98 for equipment (not shown) to supply electrical power, medical gases and vacuum. The diagnostic lab trailer 40 includes an area 100 for diagnostic, imaging and testing equipment (not shown). Each trailer 38, 40 may include any one or more of the following: a stretcher access ramp 84, a staff access stairway 86, a power lift (not shown), and the like. As indicated, each trailer 32, 34, 36, 38, 40 can be hooked to a truck tractor 102 and driven to the site of a catastrophe to triage the victims and to provide Initial Emergency Management.

FIGS. 2-17 illustrate a second embodiment of the mobile emergency hospital 30. Like elements of the two embodiments have generally similar reference numbers. Thus, in the second embodiment, numeral 130 designates the mobile emergency hospital and numerals 132, 134, 136 designate the work space and the patient treatment trailers. The mobile emergency hospital 130 is similar to the first embodiment 30, except that the trailers 132, 134, 136 use modular wall systems 200, 300, 310 (best shown in FIGS. 4, 5 and 6, respectively), and except that the trailers 132, 134, 136 are provided with slide-out rooms 232, 234, 236 (shown, for example, in FIG. 2) on one or both sides of the trailers 132, 134, 136 to provide additional space. The slide-out rooms 232, 234, 236 are also referred to herein as the expandable sections 232, 234, 236. The term "slide-out room" is used herein in the general sense to mean a section coupled to the trailer for movement between an extended use position and a retracted storage position. The slide-rooms may be mounted on tracks, ball bearings, roller bearings, hydraulic bearings, air bearings, and the like, for movement relative to the associated trailers by associated drive mechanisms. The slide-out rooms 232, 234, 236 may be of the type disclosed in U.S. Pat. Nos. 6,497,442; 6,428,073; 6,209,939 and 5,800,002, which are hereby incorporated by reference herein.

Figure 2:
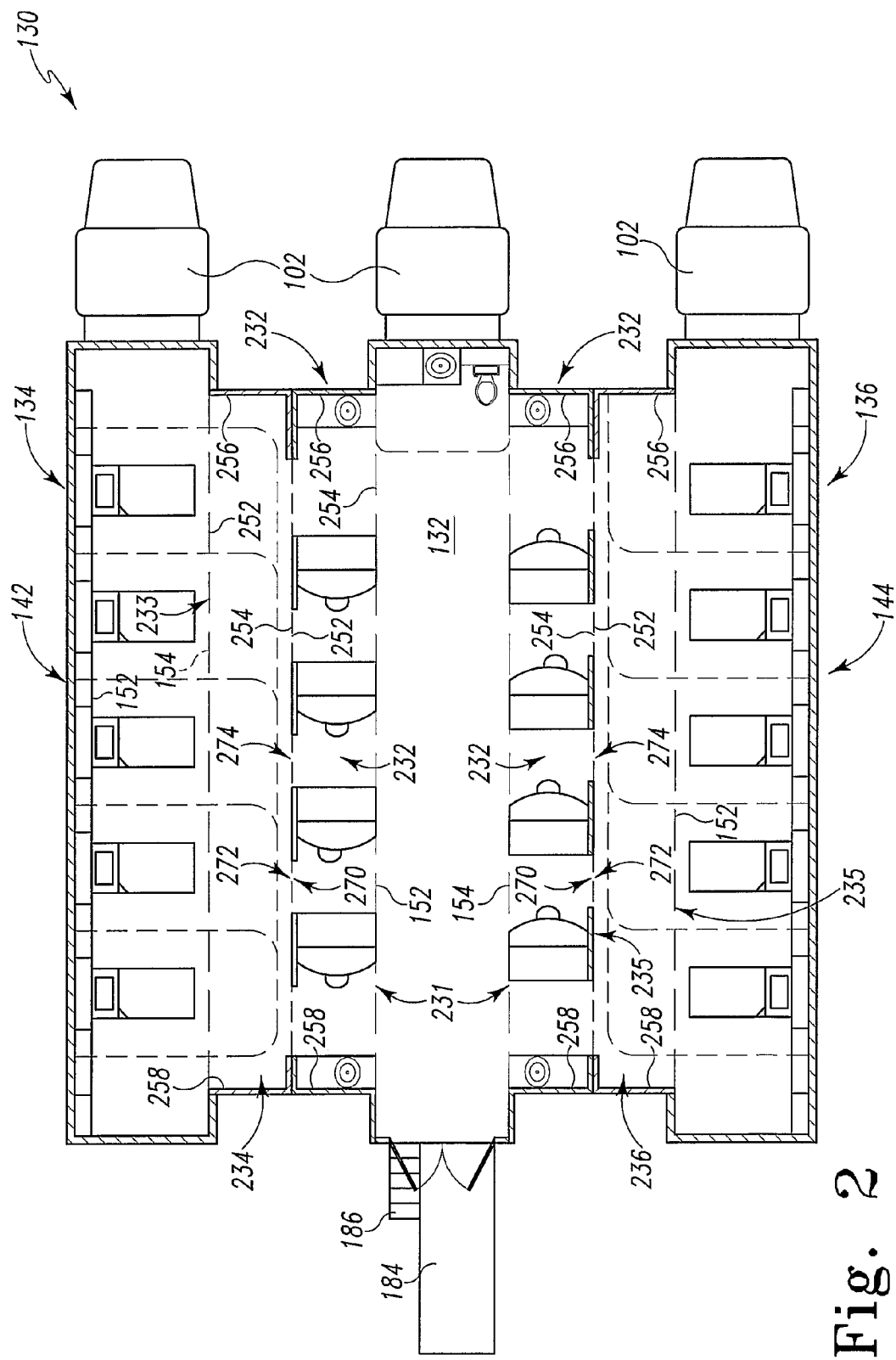
FIG. 2 is a diagrammatic plan view similar to FIG. 1 of a second embodiment of the mobile emergency hospital showing a work space trailer, a patient treatment trailer parked on each side of the work space trailer, the work space trailer having an expandable section on each side thereof, and the patient treatment trailers each having an expandable section on the side thereof facing the work space trailer.
Figure 14:
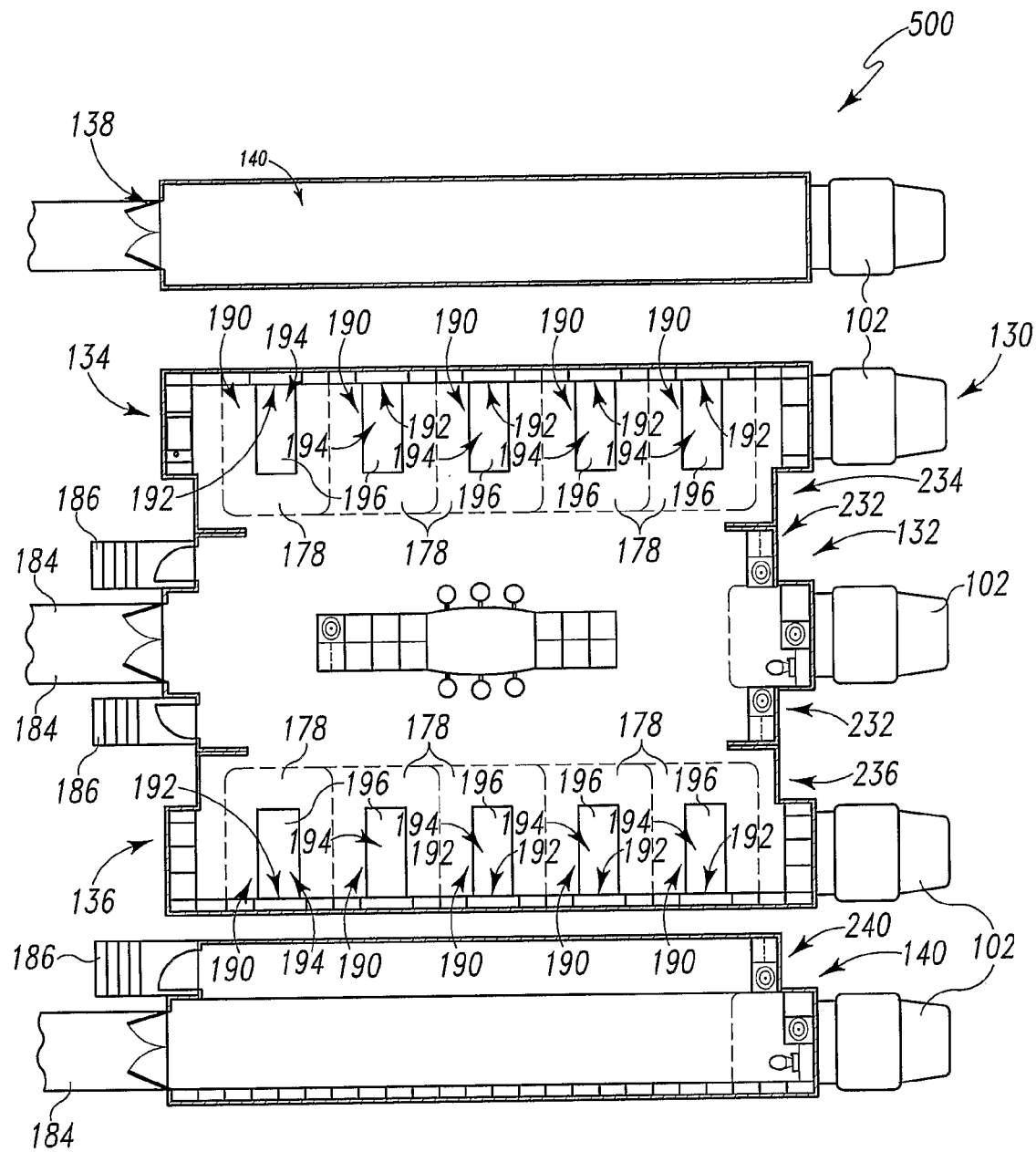
FIGS. 14-17 show four alternative site configurations of the emergency hospital.

As shown in FIG. 2, the mobile emergency hospital 130 comprises a work space trailer 132, a first patient treatment trailer 134 parked on a left side 142 of the work space trailer 132, and a second patient treatment trailer 136 parked on a right side 144 of the work space trailer 132. Parked near the work space and patient treatment trailers 132, 134, 136, are utility supply and diagnostic lab trailers 138, 140 as shown in FIG. 14. The work space trailer 132 has two slide-out rooms 232, one on each side 142, 144 thereof. The patient treatment trailer 134 parked on the left side 142 of the work space trailer 132 has a slide-out room 234 on the right side 144 thereof. The patient treatment trailer 136 parked on the right side 144 of the work space trailer 132 has a slide-out room 236 on the left side 142 thereof. The slide-out rooms 232, 234, 236 each have an open interior side that is in communication with the interior space of the associated trailers 132, 134, 136 to provide a continuous floor space between the trailer 132 and the slide-out rooms 232, the trailer 134 and the slide-out room 234, and the trailer 136 and the slide-out room 236.

The patient treatment trailers 134, 136 parked on the left and right sides 142, 144 of the work space trailer 132 will be hereinafter referred to as the left and right patient treatment trailers 134, 136, respectively. A slide-out room on the left side of a trailer will be hereinafter referred to as the left slide-out room. A slide-out room on the right side of a trailer will be hereinafter referred to as the right slide-out room. Illustratively, the interior space of each trailer 132, 134, 136, 138, 140 is approximately 8 feet (about 2.44 meters) wide, 9 feet (about 2.74 meters) high and 48 feet (about 14.64 meters) long, and the interior space of each slide-out room 232, 234, 236 and 240 is approximately 4 feet (about 1.22 meters) wide, 8 feet (about 2.44 meters) high and 44 feet (about 13.42 meters) long.

The left side wall 152 of the work space trailer 132 has a room-receiving aperture 231, and the left slide-out room 232 is coupled to the trailer 132 for movement through the aperture 231 between extended use and retracted storage positions. The right side wall 154 of the work space trailer 132 has a room-receiving aperture 231, and the right slide-out room 232 is coupled to the trailer 132 for movement through the aperture 231 between extended use and retracted storage positions. As shown in FIGS. 2 and 3, the right side wall 154 of the left patient treatment trailer 134 has a room-receiving aperture 233, and the right slide-out room 234 is coupled to the trailer 134 for movement through the aperture 233 between extended use and retracted storage positions. As shown in FIG. 2, the left side wall 152 of the right patient treatment trailer 136 has a room-receiving aperture 235, and the left slide-out room 236 is coupled to the trailer 136 for movement through the aperture 235 between extended use and retracted storage positions. The extended use and retracted storage positions of the slide-out rooms 232, 234, 235 are sometimes referred to as the deployed and collapsed positions, respectively.

The slide-out rooms 232, 234, 236 provide increased interior space for patients, caregivers and patient care equipment, and yet are sturdy and stable both in their extended use and retracted storage positions. When retracted within the confines of the interior of the respective trailers 132, 134, 136, the exterior sides of the slide-out rooms 232, 234, 236 are generally flush with the exterior sides of the associated trailers 132, 134, 136. Thus, the slide-out rooms 232, 234, 236 have no protruding projections that would interfere with the road travel of the trailers 132, 134, 136. For travel, the slide-out rooms 232, 234, 236 are retracted into the interior of the respective trailers 132, 134, 136. Also, the slide-out rooms 232, 234, 236 are retracted into the interior of the respective trailers 132, 134, 136 during parking of the trailers 132, 134, 136 in relatively small spaces.

All types of drive mechanisms for moving the slide-out rooms 232, 234, 236 relative to the respective trailers 132, 134, 136 are contemplated by this disclosure. For example, such mechanisms may include hydraulic actuators or electromechanical actuators that act directly on the slide-out rooms 232, 234, 236 or that act through various linkage assemblies to move the slide-out rooms 232, 234, 236 relative to the respective trailers 132, 134, 136. In addition, various guide assemblies, such as track and roller arrangements, linear bearings arrangements, telescoping guide columns, or the like may be provided to support and guide the slide-out rooms 232, 234, 236 during movement. Also, various locking mechanisms may be provided to lock the slide-out rooms 232, 234, 236 in their respective extended and retracted positions relative to the associated trailers 132, 134, 136. As indicated, some examples of the slide-out rooms 232, 234, 236 may be found in U.S. Pat. Nos. 6,497,442; 6,428,073; 6,209,939 and 5,800,002.

Figure 8:
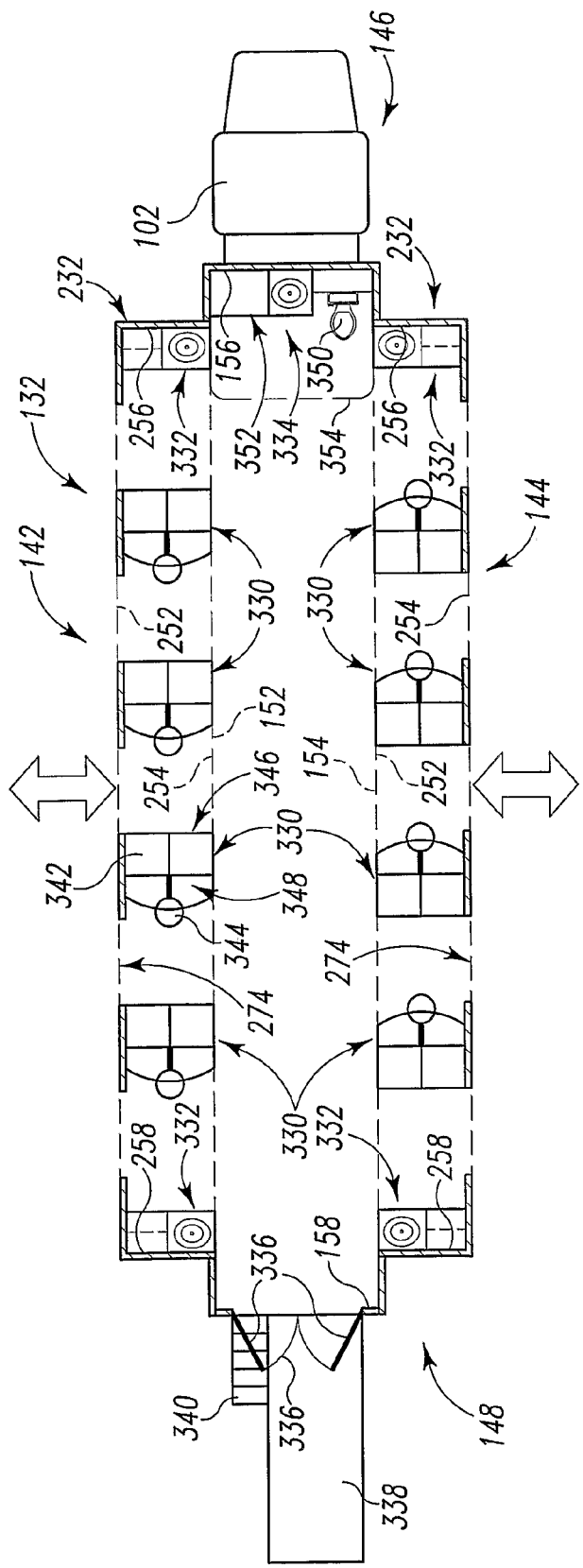
FIG. 8 is a diagrammatic plan view of a first embodiment of the work space trailer of FIG. 2 having a slide-out room on each side thereof showing four nurse work stations on each side of the work space trailer, sink and supply cabinet modules at each end of the work space trailer, and a stretcher access ramp at the rear end of the work space trailer.

The slide-out room 232 on the left side 142 of the work space trailer 132 has an exterior side wall 252, a front end wall 256, a rear end wall 258, a ceiling and a floor. The slide-out room 232 on the right side 144 of the work space trailer 132 has an exterior side wall 254, a front end wall 256, a rear end wall 258, a ceiling and a floor. As shown in FIGS. 2 and 3, the slide-out room 234 on the right side 144 of the left patient treatment trailer 134 has an exterior side wall 254, a front end wall 256, a rear end wall 258, a ceiling and a floor. As shown in FIGS. 2 and 8 the slide-out room 234 on the left side 142 of the right patient treatment trailer 136 has an exterior side wall 252, a front end wall 256, a rear end wall 258, a ceiling and a floor.

As shown in FIG. 2, the left patient treatment trailer 134 is parked on the left side 142 of the work space trailer 132 such that the right side wall 254 of the right slide-out room 234 of the left patient treatment trailer 134 confronts the left side wall 252 of the left slide-out room 232 of the work space trailer 132. The right side wall 254 of the right slide-out room 234 of the left patient treatment trailer 134 and the left side wall 252 of the left slide-out room 232 of the work space trailer 132 have respective openings 272, 270 which are generally aligned with each other to form passageways 274 through which caregivers pass between the respective trailers 132, 134. The right side wall 254 of the right slide-out room 234 of the left patient treatment trailer 134 and the left side wall 252 of the left slide-out room 232 of the work space trailer 132 are also referred to herein as the adjacent walls.

The right patient treatment trailer 136 is parked on the right side 144 of the work space trailer 132 such that the left side wall 252 of the left slide-out room 236 of the right patient treatment trailer 136 confronts the right side wall 254 of the right slide-out room 232 of the work space trailer 132. The left side wall 252 of the left slide-out room 236 of the right patient treatment trailer 136 and the right side wall 254 of the right slide-out room 232 of the work space trailer 132 have respective openings 272, 270 which are generally aligned with each other to form passageways 274 through which caregivers pass between the respective trailers 132, 136. Bridging members (not shown), such as mats, may be utilized in the passageways 274 between the adjacent slide-out rooms 232, 234, 236 to compensate for misalignment between the floors of the trailers 232, 234, 236. The left side wall 252 of the left slide-out room 236 of the right patient treatment trailer 136 and the right side wall 254 of the right slide-out room 232 of the work space trailer 132 are also referred to herein as the adjacent walls. As indicated, the slide-out rooms 232, 234, 236 have open interior sides that are in communication with the interior spaces of the respective trailers 132, 134, 136 to provide a continuous floor space.

Figure 7:
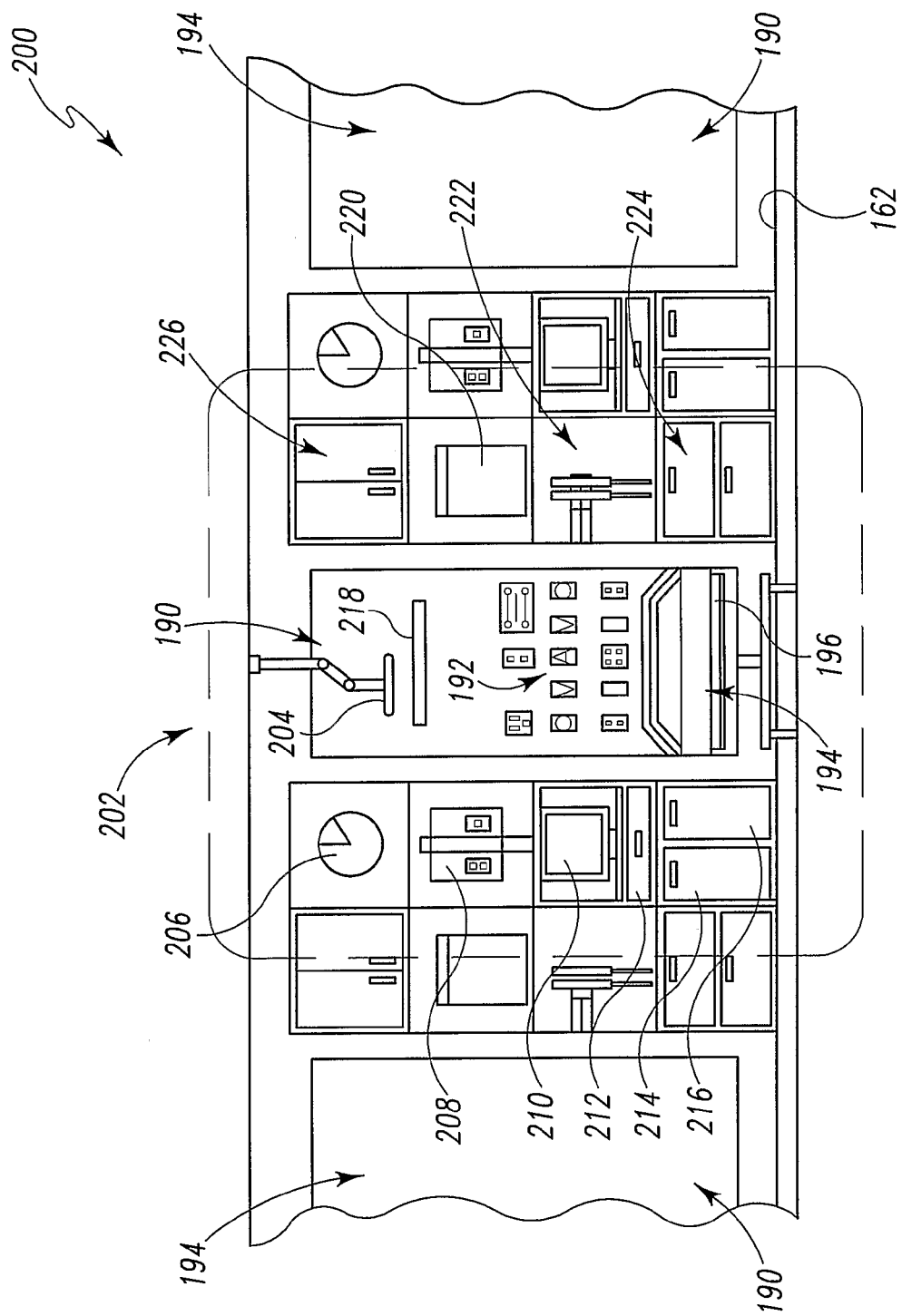
FIG. 7 an enlarged elevation view of the wall units of FIG. 4 showing one foldout bed in the open position and the remaining foldout beds in the closed positions, a patient examination light, a clock, a monitor, a fold-down shelf, a trash bin, a bio-hazard bin, a reading light, a viewbox, an OTO/opthalmascope, a plurality of supply drawers, and a plurality of service connectors near a head end of the foldout bed moved to the open position.

As shown in FIGS. 3, 4 and 7, the left side wall 152 of the left patient treatment trailer 134 has a modular wall system 200. Likewise, the right side wall 154 of the right patient treatment trailer 136 has a modular wall system which is a generally mirror image of the modular wall system 200. The left and right side walls 152, 154 of the left and right patient treatment trailers 134, 136 are also referred to herein as the non-adjacent walls of the respective trailers 134, 136. Each modular wall system 200 includes a plurality of frame units configured to rest on the floors 162 of the respective trailers 134, 136 and extend vertically upwardly. The frame units may be coupled together at their sides to form a frame structure. The frame units may be coupled to the floors of the associated trailers 134, 136, or attached to the respective walls or ceilings of the associated trailers 134, 136. The frame units form a grid of vertically and laterally spaced apart wall spaces which have a predetermined height (for example, 2 feet (0.60 meter)) and a predetermined width (for example, 2 feet 0.60 meter)). A plurality of patient care modules are positioned in the spaces to form a modular wall system that can be customized to suit the needs of a patient, caregiver and mobile emergency hospital.

The modular wall system 200 can readily integrate various pieces of modular components, such as, for example, foldout bed modules, patient care or headwall modules, clinical healthcare modules, hygiene zone modules, family zone modules, and the like. Various modular components can be interchanged and reconfigured easily by the users as the use of the space changes due to changes in functional requirements. The foldout bed modules are sometimes referred to herein as the hideaway or Murphy bed modules. The exterior surfaces of various modular components can be changed to update the look of the modular components without the need to replace the components. Decorative panels may be used to add color to a patient room. PCT Publication No. WO 2005/120300 is assigned to the same assignee as the subject application, discloses such a modular wall system and is hereby incorporated by reference herein.

As shown in FIG. 7, each illustrative modular wall system 200 includes five identical module configurations 202. In the illustrated embodiment, each module configuration 202 includes a wall unit 190, a patient examination light 204, a clock 206, a patient monitor 208, a monitor 210 with a fold-down shelf 212, a trash bin 214, a bio-hazard bin 216, a reading light 218, a viewbox 220, an OTO/opthalmoscope module 222, a plurality of supply drawers 224, a plurality of supply cabinets 226, and the like. Each wall unit 190 includes a plurality of service connectors 192 and a foldout patient bed 194. As shown in FIG. 3, each module configuration 202 includes a cubicle curtain 180 around the associated patient treatment bay 178 for privacy. Each foldout bed 194 includes a deck 196 movable between a raised storage or closed position and a lowered use or open position. Each patient treatment bay 178 is about 8 feet (2.44 meters) wide and 10 feet (3.048 meters) long, and provides about 80 square feet (7.43 square meters) of clear floor space per bed 194, meeting the AIA Guidelines for Initial Emergency Management.

Illustratively, as shown in FIGS. 4 and 7, the service connectors 192 are concealed behind the deck 196 when the deck 196 is in the storage position. The service connectors 192 include any one or more of the following: electrical power outlets to supply electrical power, medical gas outlets to supply medical gases (such as, for example, any one or more of oxygen, nitrogen, and air), negative pressure outlets to supply vacuum, and data communication ports to receive and transmit data (such as, for example, any one or more of informational, audio and video data).

As shown in FIG. 5, the left and right patient treatment trailers 134, 136 each has a modular wall system 300 along the front end wall 156. The modular wall system 300 includes a plurality of supply cabinets 302, a work counter 304, and an automated medication dispensing station 306. As shown in FIG. 6, the left and right patient treatment trailers 134, 136 each has a modular wall system 310 along the rear end wall 158. The modular wall system 310 includes a plurality of supply cabinets 312, a crash cart 314, a fire extinguisher cabinet 316, and a plurality of drawers 318.

Figure 10:
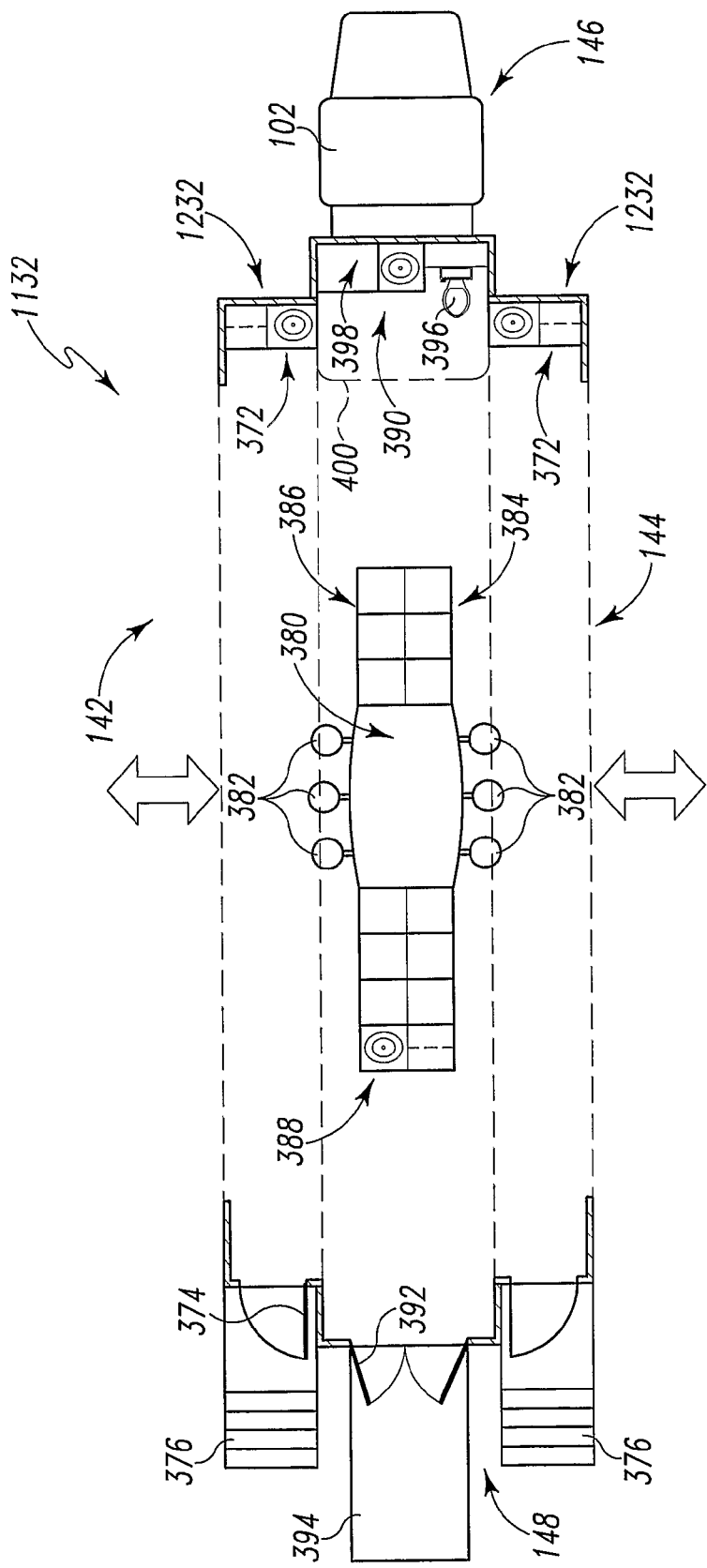
FIG. 10 is a diagrammatic plan view of a second embodiment of the work space trailer of FIG. 2 having a slide-out room on each side thereof showing a work counter with six fold-out seats in the middle of the work space trailer, a work area with a plurality of supply cabinets at each end of the work counter, a sink and supply cabinet module near one of the work areas, sink and supply cabinet modules at the front of the work space trailer, a patient hygiene center including a toilet at the front of the work space trailer, a stretcher access ramp at the rear of the work space trailer, and two staff access stairways at the rear of the work space trailer on the opposite sides of the stretcher access ramp.
Figure 11:
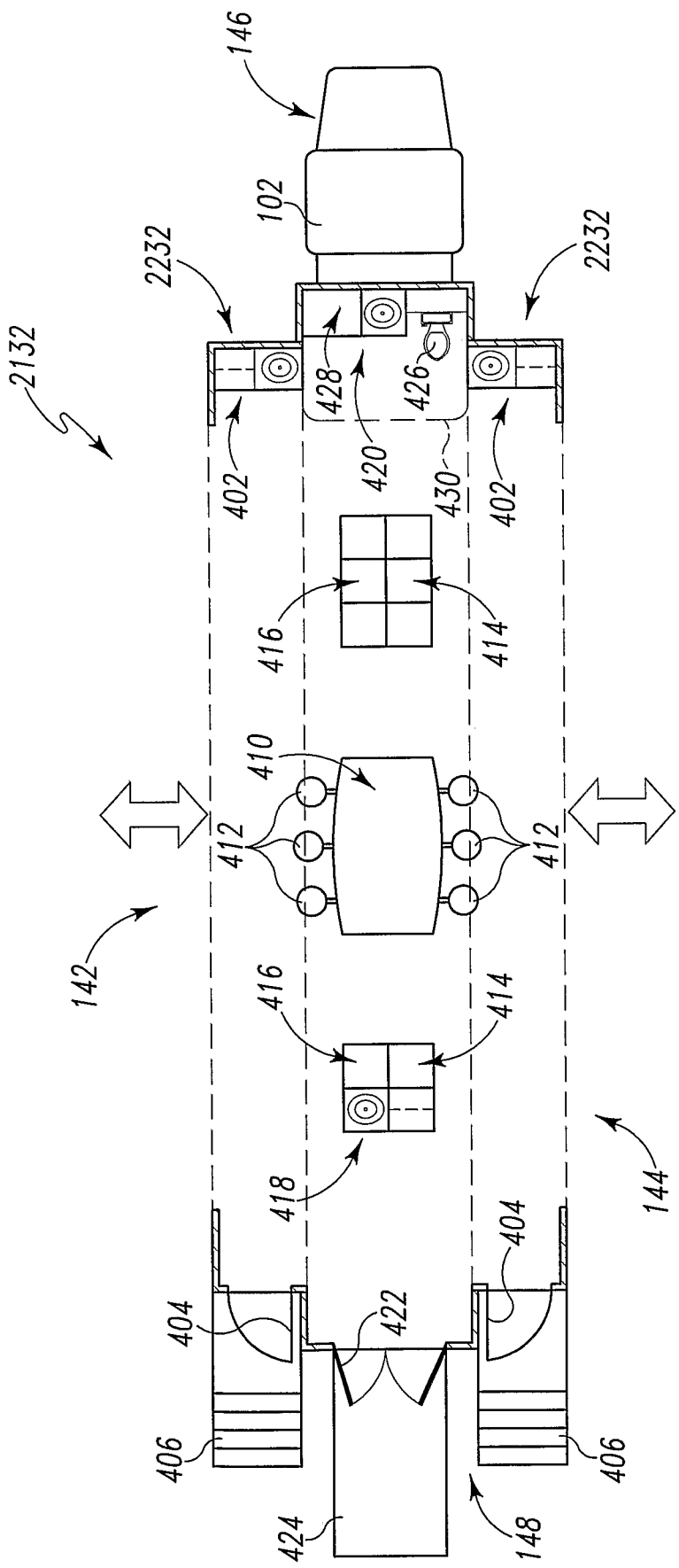
FIG. 11 is a diagrammatic plan view of a third embodiment of the work space trailer of FIG. 2 having a slide-out room on each side thereof showing a work counter with six fold-out seats in the middle of the trailer, a work area with a plurality of supply cabinets at each end of the work counter, a sink and supply cabinet module near one of the work areas, sink and supply cabinet modules at the front of the work space trailer, a patient hygiene center including a toilet at the front of the work space trailer, a stretcher access ramp at the rear of the work space trailer, and two staff access stairways at the rear of the work space trailer on the opposite sides of the stretcher access ramp.

FIG. 8 illustrates the first embodiment of the work space trailer 132. FIGS. 10 and 11 illustrate the second and third embodiments 1132, 2132 of the work space trailer 132, respectively. Referring to FIG. 8, the work space trailer 132 has two slide-out rooms 232, one on each side 142, 144. As shown in FIG. 2, the right side wall 254 of the right slide-out room 234 of the left patient treatment trailer 134 and the left side wall 252 of the left slide-out room 232 of the work space trailer 132 are formed to include passageways 274 through which caregivers pass between the trailers 132, 134. Likewise, as shown in FIG. 2, the left side wall 252 of the left slide-out room 236 of the right patient treatment trailer 136 and the right side wall 254 of the right slide-out room 232 of the work space trailer 132 are formed to include passageways 274 through which the caregivers pass between the 132, 136.

Figure 9:
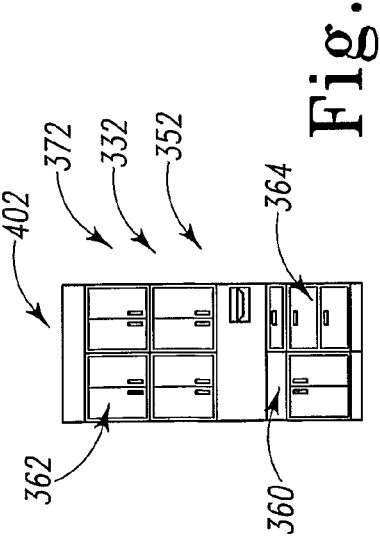
FIG. 9 is an elevation view of a sink and supply cabinet module of FIG. 8.

As shown in FIG. 8, the left and right slide-out rooms 232 each include four nurse work stations 330, a sink and supply cabinet module 332 (best shown in FIG. 9) along the front wall 256 of the slide-out room 232, and a sink and supply cabinet module 332 along the rear wall 258 of the slide-out room 232. The work space trailer 132 includes a patient hygiene module 334 along the front wall 156 of the work space trailer 132, and a pair of hinged doors 336, a retractable stretcher access ramp 338, and a retractable staff access stairway 340 at the rear end 148 of the work space trailer 132. The access ramp 338 slopes at about 30° to the pavement. As shown in FIG. 8, each nurse work station 330 includes a work counter 342, a fold-out seat 344, a plurality of supply cabinets 346, and a plurality of drawers 348. The patient hygiene module 334 includes a toilet 350, a sink and supply cabinet module 352, and a privacy curtain 354. Referring to FIG. 9, each sink and supply cabinet module 332, 352 includes a sink 360, a plurality of supply cabinets 362 and a plurality of drawers 364.

FIG. 10 illustrates the second embodiment 1132 of the work space trailer 132. The work space trailer 1132 has two slide-out rooms 1232, one on each side 142, 144. Each slide-out room 1232 includes a sink and supply cabinet module 372 at the front of the slide-out room 1232, a door 374, and a retractable staff access stairway 376 at the rear of the slide-out room 1232. As shown in FIG. 9, the sink and supply cabinet module 372 includes a sink 360, a plurality of supply cabinets 362 and a plurality of drawers 364. The work space trailer 1132 includes a work counter 380 with six fold-out seats 382, a work area 384 with a plurality of supply cabinets 386 at each end of the work counter 380, a hand washing unit 388, a patient hygiene module 390 along the front wall of the work space trailer 1132, and a pair of hinged doors 392 and a retractable stretcher access ramp 394 at the rear of the work space trailer 1132. The access ramp 394 slopes at about 30° to the pavement. The patient hygiene module 390 includes a toilet 396, a sink and supply cabinet module 398, and a privacy curtain 400.

FIG. 11 illustrates the third embodiment 2132 of the work space trailer 132. The work space trailer 2132 has two slide-out rooms 2232, one on each side 142, 144. Each slide-out room 2232 includes a sink and supply cabinet module 402 at the front of the slide-out room 2232, and a door 404 and a retractable staff access stairway 406 at the rear of the slide-out room 2232. As shown in FIG. 9, the sink and supply cabinet module 402 includes a sink 360, a plurality of supply cabinets 362 and a plurality of drawers 364. The work space trailer 2132 includes a work counter 410 with six fold-out seats 412, a work area 414 with a plurality of supply cabinets 416 at each end of the work counter 410, a hand washing unit 418, a patient hygiene module 420 along the front wall of the work space trailer 2132, and a pair of hinged doors 422 and a retractable stretcher access ramp 424 at the rear of the work space trailer 2132. The access ramp 424 slopes at about 30° to the pavement. In contrast to FIG. 10, the work areas 414 in FIG. 11 at the opposite ends of the work counter 410 are spaced apart from the work counter 410. Other arrangements of the work counters and work spaces are possible. The patient hygiene module 420 includes a toilet 426, a sink and supply cabinet module 428, and a privacy curtain 430. It is noted that various components used in the trailers 132, 134, 136 and the associated slide-out rooms 232, 234, 236 are modular, and can be mixed and matched to suit the needs of the patients, caregivers and hospital administrators. These modules may be secured to the ground or mounted on casters so that they can be moved around as needed.

Figure 12:
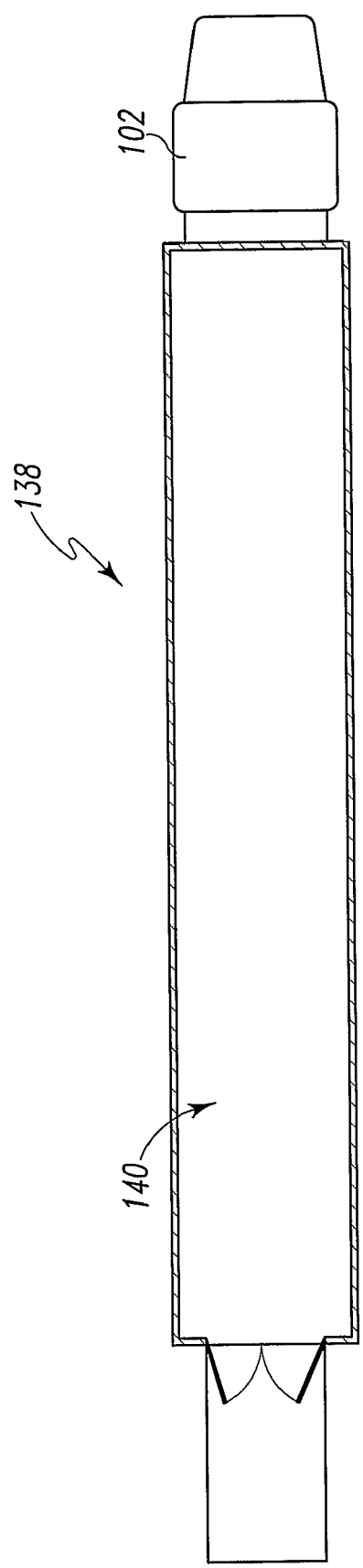
FIG. 12 is a diagrammatic plan view of a utility supply trailer of FIG. 1 showing an area in the middle for equipment to supply electrical power, medical gases and vacuum.
Figure 13:
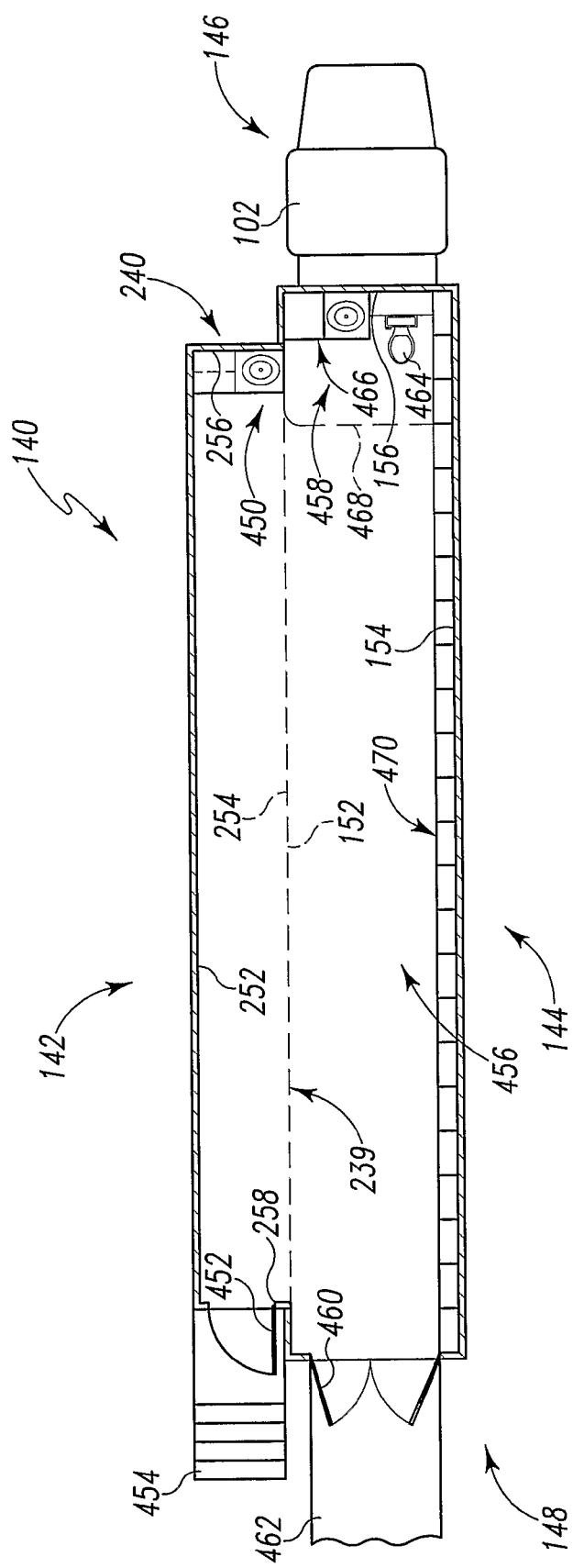
FIG. 13 is a diagrammatic plan view of a diagnostic lab trailer of FIG. 1, showing a slide-out room on the left side thereof, a plurality of reconfigurable modules along the right side thereof, a sink and supply cabinet module and a patient hygiene center including a toilet at the front of the diagnostic lab trailer, an area in the middle for diagnostic, imaging and testing equipment, a stretcher access ramp at the rear of the diagnostic lab trailer, and one staff access stairway at the rear of the diagnostic lab trailer on the left side of the stretcher access ramp.

As shown in FIG. 12, the utility supply trailer 138 includes an area 440 for equipment (not shown) to supply electrical power, medical gases and vacuum. The utility supply trailer 138 may include any one or more of the following: a stretcher access ramp (not shown), a staff access stairway (not shown), a power lift, and the like. As shown in FIG. 13, the diagnostic lab trailer 140 includes a slide-out room 240 on the left side 142 thereof The left side wall 152 of the diagnostic lab trailer 140 has a room-receiving aperture 239, and the left slide-out room 240 is coupled to the trailer 140 for movement through the aperture 239 between extended use and retracted storage positions. When retracted into the confines of the interior of the diagnostic lab trailer 140, the outer wall of the slide-out room 240 is generally flush with the outer wall of the trailer 140. The diagnostic lab trailer 140 includes storage facilities 470 for storing stretchers during transit.

The slide-out room 240 includes a sink and supply cabinet module 450 at the front of the slide-out room 240, and a door 452 and a retractable staff access stairway 454 at the rear of the slide-out room 240. The diagnostic lab trailer 140 includes an area 456 for diagnostic, imaging and testing equipment (not shown), a patient hygiene module 458 along the front wall of the diagnostic lab trailer 140, and a pair of hinged doors 460 and a retractable stretcher access ramp 462 at the rear of the diagnostic lab trailer 140. The access ramp 462 slopes at about 30° to the pavement. The patient hygiene module 458 includes a toilet 464, a sink and supply cabinet module 466, and a privacy curtain 468.

FIGS. 14-17 show four alternative site configurations of the mobile emergency hospital 130. Each of these configurations of the mobile emergency hospital 130 use a multiple, including one, of a core unit 500 of 10 hospital beds. Each core unit 500 comprises one work space trailer 132 and two patient treatment trailers 134, 136 parked on the opposite sides of the work space trailer 132, with each patient treatment trailer 134, 136 having a capacity of 5 hospital beds. A 10-hospital bed configuration of the mobile emergency hospital 130 shown in FIG. 14 includes one core unit 500. A 20-hospital bed configuration of the mobile emergency hospital 130 shown in FIG. 15 includes two core units 500. A 30-hospital bed configuration of the mobile emergency hospital 130 shown in FIG. 16 includes three core units 500. A 10-hospital bed configuration of the mobile emergency hospital 130 shown in FIG. 17 includes one core unit 500.

Referring to FIG. 14, the utility supply and diagnostic lab trailers 138, 140 are parked near the work space and patient treatment trailers 132, 134, 136. The utility supply trailer 138 supplies utilities and the diagnostic lab trailer 140 provides lab facilities to one core unit 500 comprising one work space trailer 132 and two patient treatment trailers 134, 136. As indicated, each trailer 132, 134, 136, 138, 140 can be hooked to a truck tractor 102 and driven to the site of a catastrophe, such as, for example, a hurricane, a flood, a wild fire, an earth quake, and the like, to triage the victims and to provide Initial Emergency Management.

Figure 15:
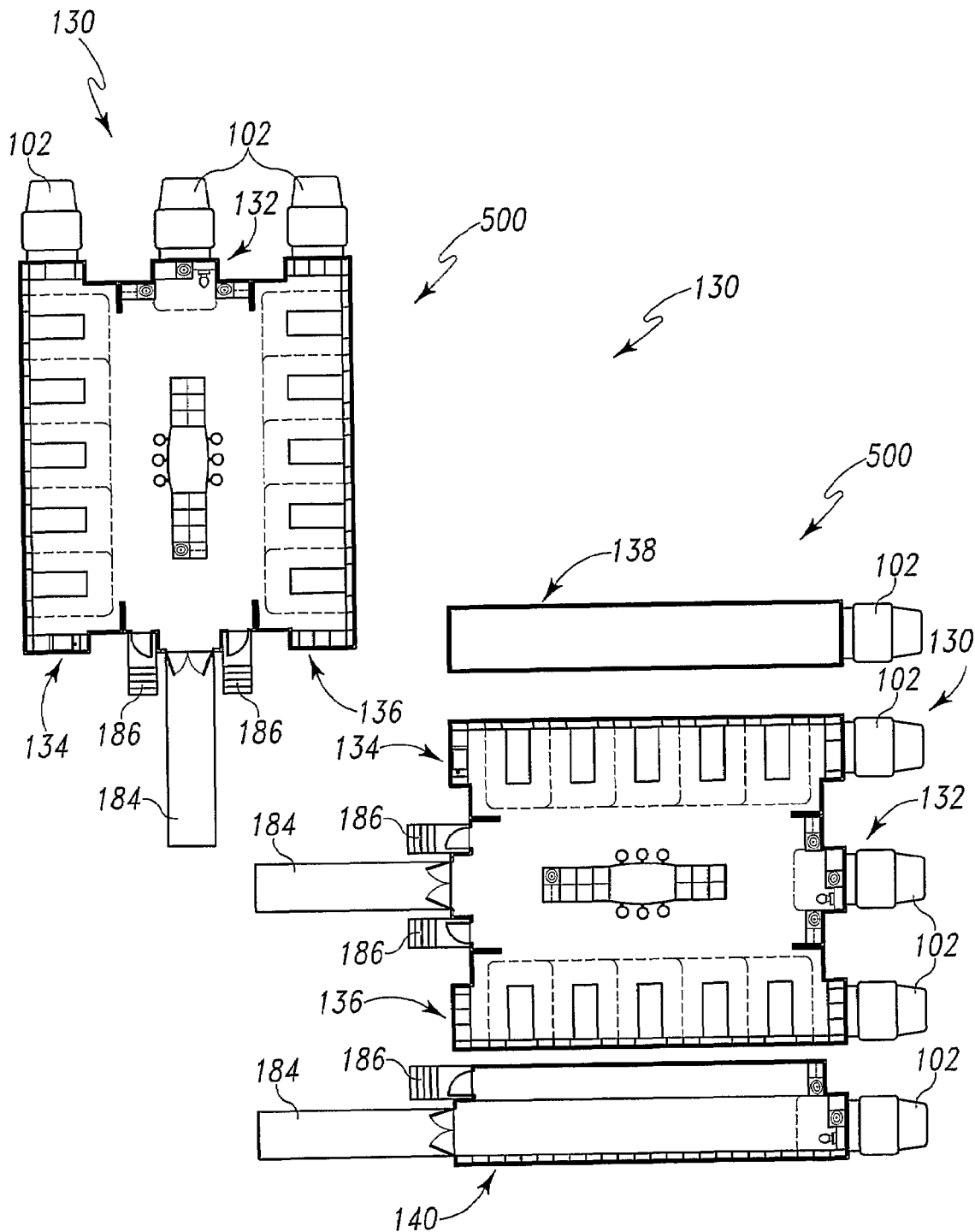
Figure 16:
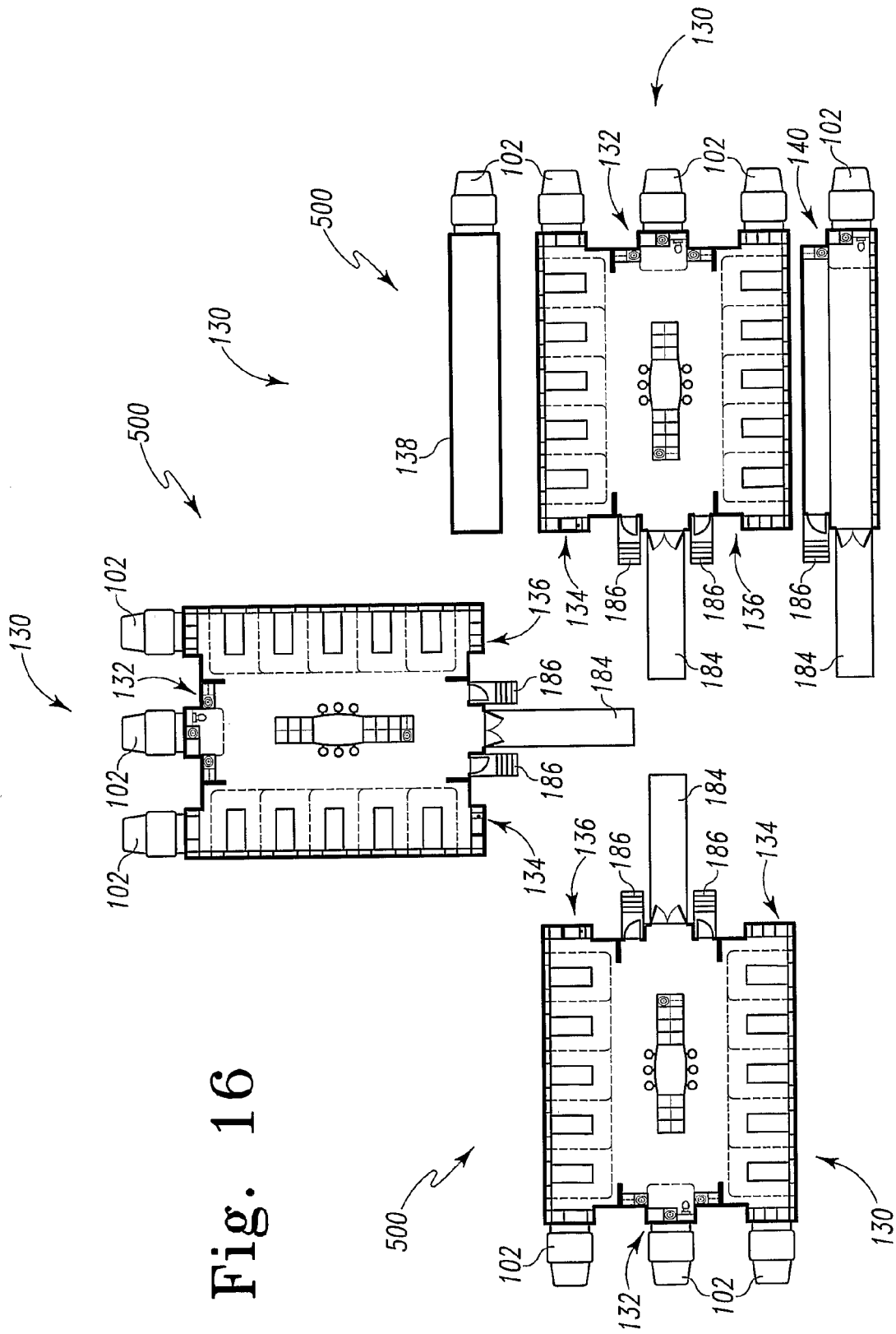

As shown in FIG. 15, the utility supply trailer 138 supplies utilities and the diagnostic lab trailer 140 provides lab facilities to two core units 500, each comprising one work space trailer 132 and two patient treatment trailers 134, 136. As shown, the second core unit 500 is parked generally at right angles to the first core unit 500. Referring to FIG. 16, the utility supply trailer 138 supplies utilities and the diagnostic lab trailer 140 provides lab facilities to three core units 500, each comprising one work space trailer 132 and two patient treatment trailers 134, 136. The second core unit 500 is parked generally at right angles to the first core unit 500, and the third core unit 500 is parked on the opposite side of the first core unit 500.

Figure 17:
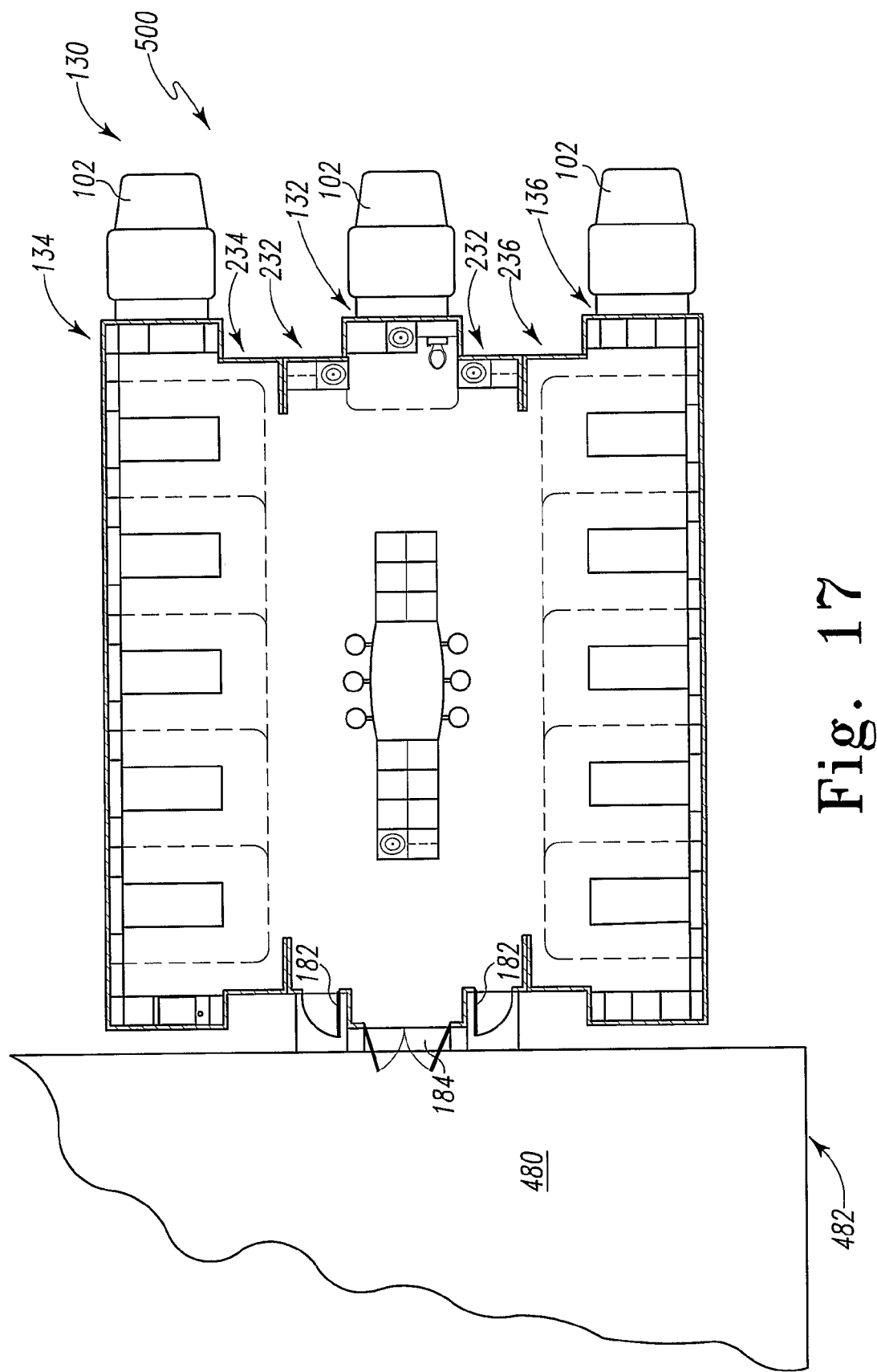

FIG. 17 shows a fourth configuration of the mobile emergency hospital 130 that is parked next to the emergency department 480 of an existing hospital 482. The mobile emergency hospital 130 has a capacity of 10 hospital beds 194. The utilities and the diagnostic lab facilities for the mobile emergency hospital 130 are supplied by the existing hospital 482.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

There is a plurality of advantages of the present invention arising from the various features of the embodiments described herein. It will be noted that alternative embodiments of the present invention may not include all of the features described yet still benefit from at least some of the advantages of such features. Those of ordinary skill in the art may readily devise their own implementations of a device that incorporates any one or more of the features of the present invention and fall within the spirit and scope of the present invention as defined by the appended claims.

The invention claimed is:

1. A mobile emergency hospital comprising:
   a first wheeled trailer having patient care equipment associated with a first portion of the emergency hospital, and a second wheeled trailer parked alongside the first trailer such that adjacent side walls of the first and second trailers are arranged to confront each other, the second trailer having patient care equipment associated with a second portion of the emergency hospital, the adjacent side walls of the first and second trailers having openings which are generally aligned with each other to form one or more passageways through which caregivers pass between the first and second trailers, wherein the first trailer comprises a patient treatment trailer having at least one wall unit including a plurality of service connectors and a foldout patient bed, the foldout bed including a deck movable between a raised storage position and lowered use position.

2. The emergency hospital of claim 1, wherein the service connectors are concealed behind the deck when the deck is the storage position.

3. The emergency hospital of claim 1, wherein the at least one wall unit includes a plurality of such wall units arranged along a non-adjacent side wall of the patient treatment trailer, and each wall unit includes a plurality of service connectors and a foldout bed having a deck movable between a raised storage position and a lowered use position.

4. The emergency hospital of claim 1, wherein the plurality of service connectors include any one or more of the following: electrical power outlets to supply electrical power, medical gas outlets to supply medical gases, negative pressure outlets to supply vacuum, and data communication ports to receive and transmit data.

5. The emergency hospital of claim 1, wherein the patient treatment trailer includes any one or more of the following: light modules, a patient monitor module, an equipment monitor module, a computer module, a fold-down shelf module, a fold-down seat module, an overbed table module, a trash module, a bio-hazard module, a clock module, an examination light module, a view-box module, a storage module, a supply module, a crash cart module, an automated medication dispensing module, a fire extinguisher module, a hand washing module, a supply cabinet module, a storage cabinet module and OTO/ophthalmoscope module.

6. The emergency hospital of claim 1, wherein the second trailer comprises a work space trailer having any one or more of the following: light modules, a corridor module, a triage module, a nurse work station module, a work counter module, a fold-down shelf module, a fold-down seat module, a patient toilet module, a hand washing module, a shower module, a patient charting module, a supply cabinet module, a storage cabinet module, a trash module, a bio-hazard module, a fire extinguisher module, an access ramp module, a door module and a stairs module.

7. The emergency hospital of claim 6, further comprising a second patient treatment trailer parked alongside the work space trailer on the side of the work space trailer opposite from the first-mentioned patient treatment trailer, wherein adjacent side walls of the work space trailer and the second patient treatment trailer have openings which are generally aligned with each other to form one or more passageways through which caregivers pass between the respective trailers, the second patient treatment trailer has a plurality of wall units along a non-adjacent side wall of the second patient treatment trailer, each such wall unit of the second patient treatment trailer includes a plurality of service connectors and a foldout patient bed, each foldout bed includes a deck movable between a raised storage position and a lowered use position.

8. The emergency hospital of claim 6, further comprising a utility supply trailer parked adjacent to the patient treatment trailer and the work space trailer, wherein the utility supply trailer includes any one or more of the following: equipment to supply electrical power, equipment to supply medical gases, equipment to supply vacuum, a hand washing module, a toilet module, and facilities for transmitting and receiving data.

9. The emergency hospital of claim 8, further comprising a plurality of service lines and conduits extending from the equipment located in the utility supply trailer to the associated service connectors in the patient treatment trailer.

10. The emergency hospital of claim 9, wherein the service lines and conduits are routed, in part, through any one or more of the following: the ceiling, the floor and the walls of the respective trailers.

11. The emergency hospital of claim 6, further comprising a diagnostic lab trailer parked adjacent to the patient treatment trailer and the work space trailer, wherein the diagnostic lab trailer includes any one or more of the following: diagnostic equipment, imaging equipment, testing equipment, a hand washing module, a toilet module and storage for stretchers.

12. A mobile emergency hospital comprising:
a first wheeled trailer having patient care equipment associated with a first portion of the emergency hospital, and
a second wheeled trailer parked alongside the first trailer such that adjacent side walls of the first and second trailers are arranged to confront each other, the second trailer having patient care equipment associated with a second portion of the emergency hospital, the adjacent side walls of the first and second trailers having openings which are generally aligned with each other to form one or more passageways through which caregivers pass between the first and second trailers, wherein each trailer has a pair of end walls and a pair of side walls extending between the end walls to define an interior space, and at least one of the side walls of at least one of the trailers is openable.

13. The emergency hospital of claim 12, wherein the at least one of the trailers has at least one expandable section, and an interior side wall of the at least one expandable section opens to the interior space of the at least one of the trailers.

14. The emergency hospital of claim 13, wherein the openable side wall of the at least one of the trailers is an exterior wall of the at least one expandable section.

15. The emergency hospital of claim 14, wherein the at least one expandable section is a slide-out room.

16. The emergency hospital of claim 15, wherein the at least one of the trailers is approximately 8 feet (2.44 meters) wide and 48 feet (14.63 meters) long, and the slide-out room is approximately 4 feet (1.22 meters) wide and 44 feet (13.41 meters) long.

17. The emergency hospital of claim 1, wherein each trailer is approximately 8 feet (2.44 meters) wide and 48 feet (14.63 meters) long.

18. A mobile emergency hospital comprising a patient treatment trailer including at least one wall unit having a plurality of service connectors and a foldout patient bed, the foldout bed including a deck movable between a raised storage position and a lowered use position.

19. The mobile emergency hospital of claim 18, wherein the patient treatment trailer has end walls and side walls extending between the end walls to form an interior space to house patient care equipment, at least one of the side walls of the trailer having an expandable section.

* * * * *